June 24, 1930.  E. ADAMSON  1,765,359
INTERNAL COMBUSTION ENGINE
Filed Feb. 16, 1929
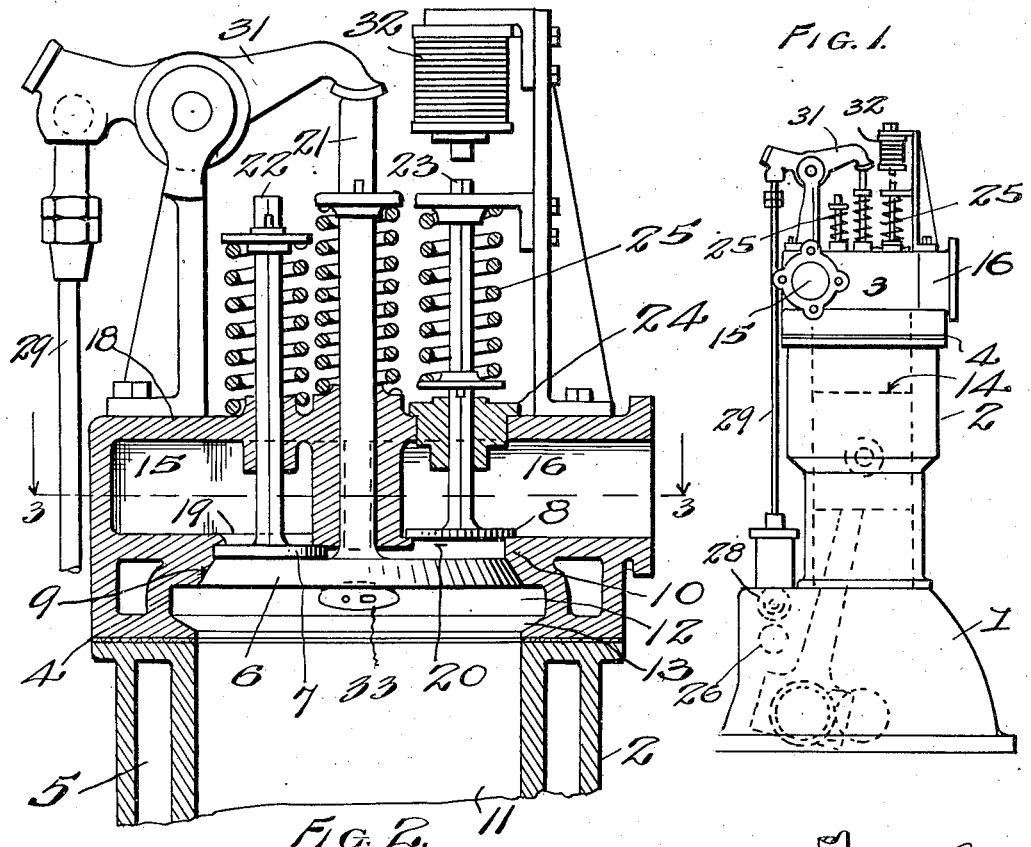
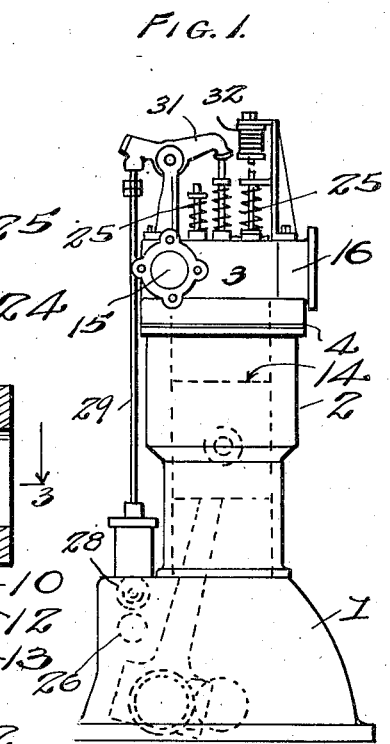
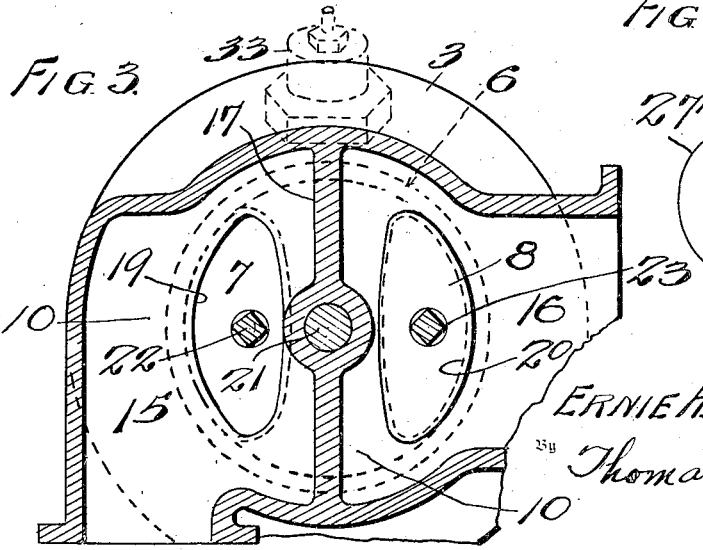
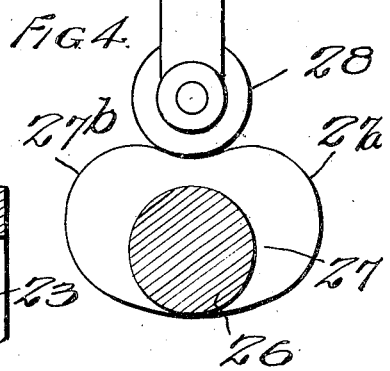
Inventor
ERNIE ADAMSON
By Thomas R. Harney
Attorney Patented June 24, 1930

1,765,359

UNITED STATES PATENT OFFICE

ERNIE ADAMSON, OF NEW YORK, N. Y.

INTERNAL-COMBUSTION ENGINE

Application filed February 16, 1929. Serial No. 340,611.

My present invention relates to improvements in internal combustion engines and particularly to the construction of the cylinder and arrangement of valves therefor, whereby the head of the cylinder is utilized as a movable member and performs the functions of a main valve in the control of the intake of fuel charges, and also in the control of the exit of exhaust gases of combustion from the cylinder. In combination with the main valve I also utilize an auxiliary intake valve for fuel charges and an auxiliary exhaust valve for exit of the gases of combustion, and these auxiliary valves co-operate with the main valve in the control of the fuel charges and exhaust gases.

While I have illustrated, and hereinafter described the invention as embodied in a four cycle internal combustion engine using a spark plug for the ignition of the charges, it will be understood that the invention is also applicable for use in motors of the Diesel and other types of engines.

By utilization of the principles of my invention in an internal combustion engine as herein illustrated, the cylinder is provided with an ample and adequate combustion chamber, but the area of the clearance space for the piston is reduced to a minimum, in order that the fuel charge may properly be compressed for ignition or explosion, with consequent greater efficiency in the power of the working stroke of the motor. The movable head of the cylinder, or the main valve which forms the movable head of the cylinder, together with the auxiliary intake and exhaust valves, are so constructed and compactly arranged, that the fuel charge enters directly into the compression chamber, and that substantially the entire quantity of exhaust gases, independently of and separated from the fuel mixture, is eliminated from the combustion chamber during each cycle of the engine.

By this compact arrangement and operation of the three valves, only a minimum residue of exhaust gases is permitted to remain in the cylinder, and consequently the fuel charge is not materially diluted, but is fresh, and maintained at its degree of highest efficiency until the explosion takes place.

Due to the elimination of all unnecessary clearance space in the combustion end of the cylinder, only such quantity of the fuel mixture as will provide an adequate fuel charge can be admitted to the combustion chamber. Therefore waste and unnecessary use of fuel is avoided, choking of the motor is eliminated, and economy in the use of the fuel is attained. The reduction of the combustion chamber to a minimum, but ample size, also has the effect of increasing compression, and thereby permits the use of low grade fuel, as kerosene, or other fuels less volatile than gasoline.

The three valves are preferably spring pressed, and they are operated at the proper intervals in the cycle of the engine. For instance, the main valve may positively and mechanically be opened by means of a rocker arm and push rod operating synchronously with the crank shaft of the motor, through a cam device. The auxiliary intake valve may be opened either by suction from the interior of the cylinder, or by force of the fuel charge as it is supplied to the cylinder under pressure from a supercharger; and the exhaust valve is here illustrated as opened through the instrumentality of a solenoid magnet, which is included in the ignition circuit of the motor and energized in synchronism with the movement of the crank shaft and the timing of the ignition.

In the accompanying drawings I have illustrated one complete example of the physical embodiment of my invention wherein the parts are combined and arranged according to one mode I have devised for the practical application of the principles of my invention, but it will be understood that various changes and alterations may be made in the exemplified structure, without departing from the principles of my invention.

For illustrative purposes I have confined the showing of the invention to a single cylinder engine, and it will of course be understood that the invention is designed for use in multi-cylinder engines.

Figure 1 is a view in side elevation showing a conventional type of internal combustion engine equipped with the cylinder and valve arrangement of my invention.

Figure 2 is an enlarged, vertical sectional view at the head of the engine, looking in the same direction as in Figure 1, and showing the main and auxiliary valves closed.

Figure 3 is a horizontal sectional view at line 3—3 of Figure 2, indicating by dotted lines the position of the spark plug.

Figure 4 is an enlarged detail view showing the cam shaft and cam thereon in its relation to the cam roller and push rod.

In order that the general arrangement and relation of parts may readily be understood I have shown in Figure 1 a conventional motor having the usual crank case 1 and engine block 2, above which is located the engine head 3, the usual gasket 4 and water jacket 5 being indicated.

The main valve may be of suitable shape, but is here shown as a circular disk 6 with the usual beveled edge, while the auxiliary intake valve 7 and exhaust valve 8 are of approximate elliptical shape, located directly above the main valve at diametrically opposite sides of its center with their outer edges conforming to the shape of the main valve and disposed within a space of less diameter than the diameter of the main valve.

The main valve is adapted to move upwardly and close against a complementary seat 9 fashioned in the horizontal wall 10 of the engine head, and this main valve forms a movable head for closing the upper end of the cylinder 11. The face of the main valve has an area complementary to the cross sectional area of the bore of the cylinder, and below the main valve and the wall 10 the engine head is fashioned with a combustion chamber 12 having a diameter slightly greater than the bore of the cylinder. A beveled shoulder 13 is fashioned within the opening at the lower face of the engine head, and it will be apparent that the fuel mixture may pass around the beveled edges of the main valve, when the valve is open, and that exhaust gases of combustion may also pass, upwardly, around the edge of the main valve when the latter is opened.

The clearance space above the head of the piston 14 (shown by dotted lines in Figure 1) when the latter is at its highest point, is thus limited to the enlarged combustion chamber 12 in the engine head. The area of this chamber, when the main valve is closed is of ample capacity to provide the space for compression and combustion of the fuel charge, but all unnecessary clearance space is eliminated.

Above the wall 10 of the engine head are provided lateral chambers 15 and 16, the former for fuel mixture and the latter for exhaust gases, and these chambers are divided by a diametrically extending vertical partition 17, below the top wall 18 of the chambers.

The intake valve 7 controls the intake port 19 and the exhaust valve 8 controls the exhaust port 20, both of these ports opening directly from the seat of the main valve into their respective chambers 15 and 16, the valve 7 opening downwardly for entrance of a fuel charge into the combustion chamber when the main valve is open, and the valve 8 opening upwardly for exit of exhaust gases when the main valve is opened.

The valves 6, 7, and 8 are provided with respective stems 21, 22 and 23, disposed in parallel planes and slidable in guide bushings in the top wall 18, the bushing 24 for the exhaust valve being removable for the purpose of providing an opening in the top wall 18 of sufficient size to permit the assembly of the exhaust valve.

Each valve is provided with a spring as 25 to close the main valve and the two auxiliary valves, the spring of the exhaust valve of course exerting its tension in direction opposite to that of the springs of the intake and main valves.

The main valve is positively and mechanically opened in synchronism with the movement of the crank shaft of the engine through a cam shaft 26 which is provided with a cam 27 having two lobes 27$^a$ and 27$^b$ for co-action with the cam roller 28 carried at the lower end of the push rod 29 and held to the cam by a spring 30 as usual. The push rod extends upwardly at the side of the engine and actuates the usual pivoted rocker arm 31 that bears upon the free end of the spring pressed stem 21 of the main valve, and the valve and its stem are depressed (to open the valve) twice during each revolution of the cam.

The spring pressed intake valve, when the main valve is open, may be opened either by suction from the interior of the cylinder, or by motive force of the fuel mixture under pressure from a supercharger as the latter pumps the fuel to the intake chamber.

As here shown, the exhaust valve, when the main valve is open, may be opened by means of an electrical solenoid magnet 32 co-operating with the stem 23 of the exhaust valve to lift the valve. The solenoid 32 and the spark plug 33, are of course included in the electrical ignition system of the motor, and the solenoid is energized in synchronism with and timed for movement with the crank shaft and timing mechanism of the ignition system.

Having thus fully described my invention, what I claim as new and desire to secure by Letters Patent is:—

1. In an engine as described the combination with a cylinder having an end valve-seat, a master valve adapted to close said seat and means for opening the valve, an intake valve for controlling admission of fuel mixture through a port opening within said seat, and an exhaust valve for controlling exit of gases through another port within said seat.

2. The combination with an engine head having a large valve seat and spaced ports within the periphery of said seat, a main valve for closing said seat, an intake valve and an exhaust valve for the respective ports, and means for operating said valves.

3. The combination with a cylinder, an engine head having a valve seat, and a main valve closing said seat and forming the cylinder head, said engine head having a pair of spaced ports within the periphery of the valve seat, an intake valve and an exhaust valve for these ports, and means for operating the valves.

4. The combination of a cylinder, an engine head having a valve seat and a main valve approximately the diameter of the cylinder closing said seat and forming the cylinder head, said engine head having a pair of spaced ports exterior of the main valve and within the periphery of the valve seat, an intake valve and an exhaust valve for these ports, means for operating the valves, and said engine head having a combustion chamber at the under side of the main valve.

5. The combination with a hollow engine head having a transverse partition forming an intake chamber and an exhaust chamber and elliptical ports for said chambers, of flat valves for said ports and operating means for the valves, said head having a valve seat opening through said ports, a main valve closing the valve seat and means for operating the valve, and said head having a combustion chamber below the main valve.

6. The combination with a cylinder having a valve seat and a transverse partition adjacent forming intake and exhaust chambers, a main valve for the seat, a plurality of ports within the periphery of said seat, valves for said ports and means for operating all of the valves.

7. In an internal combustion engine, the combination with a main valve having a seat and a plurality of laterally spaced ports within the periphery of the seat, of a plurality of auxiliary valves for controlling said ports.

In testimony whereof I affix my signature.

ERNIE ADAMSON.